UNITED STATES PATENT OFFICE.

MAXWELL O. JOHNSON, OF WAIPIO, TERRITORY OF HAWAII.

PROCESS OF MAKING FRUIT SYRUP.

1,362,870. Specification of Letters Patent. Patented Dec. 21, 1920.

No Drawing. Original application filed September 12, 1919, Serial No. 323,234. Divided and this application filed January 17, 1920. Serial No. 352,183.

*To all whom it may concern:*

Be it known that I, MAXWELL O. JOHNSON, a citizen of the United States, residing at Waipio, in the county of Honolulu, Territory of Hawaii, have invented certain new and useful Improvements in Processes of Making Fruit Syrup, of which the following is a specification.

The invention relates to a process of producing syrup from fruit juice and in certain of its aspects and features, and as herein described by way of example, the process is especially directed to the production of syrup from pineapple juice, although in some of its aspects the invention is of more general applicability, as already indicated.

One of the objects of the present invention is to effect or perform the various steps of the process in such order or relation to each other as to secure by such sequence or interrelation of the various steps of the process a superior product not otherwise obtainable.

More in detail the present invention has for one of its objects the carrying out of certain steps of the process in such sequence or interrelation as to effect a permanent and stable clarification of the resultant syrup such that it will not cloud, produce sediment or other solid matter, or go off color howsoever long the syrup may be kept after manufacture.

By one feature of the invention the addition or admixture of the sugar with the fruit juice is effected prior to the filtration, thereby effecting a more complete clarification of the liquid, and also rendering the clarification permanent instead of temporary, as is otherwise the case. In this manner there is secured a clearer and more brilliant product, and the natural flavor is retained in full deliciousness due to the minimum heating of the uncooked juice, or juice of the uncooked fruit.

When the sugar is added subsequently to filtration, it is possible to produce temporarily a syrup which is clear and of the desired color, but such a syrup later will become cloudy and go off color. Such deterioration damages the flavor of the syrup, may endanger its permanency, and also very materially impairs its merchantability and its value, and may entirely destroy its availability as an article of commerce.

In other aspects of the invention certain steps are combined with the foregoing to produce in other respects syrup or syrups of the very highest class, as for instance, the cold expression and concentration of the juice and the consequent avoidance of cooking, preserves the natural flavor of the fruit and in its full strength. Other features of the invention not pointed out in detail at this point will be clear from the following detail description and the appended claims.

The present application is a division of application Ser. No. 323,234 filed September 12, 1919, and like that application, this describes in an exemplary and explanatory manner, the application of the invention, as hereinbefore outlined, to the making of syrup from pineapple juice.

Referring now, by way of example, to the handling or processing of pineapple juice in accordance with the invention, the juice is preferably extracted by pressing the uncooked and unheated fruit. With many fruits, however, heating and the addition of water are necessary for the satisfactory extraction of the juice.

In the usual commercial process of canning pineapples, large quantities of the juice are produced, which are not utilized in the canning process. In the canning process also a very considerable portion of the pineapples is not utilized, and is merely waste so far as the canning is concerned, as only the central part of the fruit is cored out in disk form and canned. By the present process, the waste or surplus juice resulting from the coring of the fruit or canning, and also the juice from the waste or unused portions of the pineapple is saved. The juice used may therefore be that which is usually waste from the canning process. It will be clear, of course, that the entire fruit may be utilized if desired, and the treatment of the juice be entirely independent of the canning of the fruit. With other fruits, the process of juice extraction will be varied in ways which are well understood by those skilled in the art.

The juice is concentrated without boiling down, or employing other or like steps which destroy the characteristic flavor of the pineapple, or other fruit, which deterioration is probably caused by the evaporation or breaking down of essential or other organic compounds which impart the characteristic flavors to the various fruits.

By my invention the juice is concentrated by freezing, whereby the water, or equivalent element or component of the juice, separates out as ice, and the sugars, acids, and flavoring matters of the pineapple or other fruit are preserved or perpetuated and concentrated in the unfrozen liquid. This freezing may be effected with an ordinary ice-making plant, the juice being pumped or pouring into the usual ice-cans of such a plant, and frozen, or partly frozen to any required or desired degree. The degree to which the juice is concentrated will depend on the amount of freezing which takes place, and this in turn depends upon the length of time of the freezing action.

In commercial practice, I prefer to preliminarily cool the juice by passing it through coils surrounded by the cold brine or other liquid used in the ice plant. The juice may be chilled also, or additionally, by using the ice which has been produced from, and separated out of, previously frozen juice. This procedure will shorten the time of freezing in the cans of the ice machine.

By continuing the freezing action for a sufficient length of time, or by repeated freezing, the original or natural juice may be brought to a concentration of five or six times that of the original juice. In practical commercial work, it is frequently desirable to produce a concentrated juice of about two to three times the strength of the original or natural juice. In practice I have found that with an ice plant having cans of three hundred pounds capacity, this concentration can be effected in from thirty-six to forty-eight hours, the temperature of the brine or other freezing liquid being also a factor. With other juices, different degrees or ratios of concentration will be found desirable. It is understood that the figures and proportions given are illustrative and exemplary and are not restrictive of the invention.

When the juice is frozen in the ice cans as described, the freezing progresses from the walls of the cans inwardly, and there is usually left within the ice block a central cavity containing a large proportion of the concentrated juice. When the desired degree of concentration has been reached and the freezing period has been completed, it is advisable to drain off the concentrated juice from this interior cavity. The ice is then broken into small pieces, and the juice adherent thereto is separated and collected. In commercial practice, I prefer to run the block of ice into an ice breaking machine, wherein the ice is broken into quite small pieces. A drain may be supplied at this point which will gather and carry off an additional quantity of the concentrated juice. The remainder of the juice, which is still adherent to the ice fragments, is then separated by a centrifugal machine, although other separating means may be employed if desired.

As already indicated, the freezing operation or process may be repeated for the purpose of obtaining a still greater concentration of the juice, where this is desired. In the case of pineapple juice, the original or natural juice will frequently or usually test eleven or twelve degrees with the Brix hydrometer (although some juices will test fifteen degrees or higher), corresponding roughly to eleven or twelve per cent. of sugar. I have found it advantageous in actual practice to concentrate the natural juice to from twenty-two to thirty degrees Brix, as the most practical concentration for commercial work.

For most uses, it is desirable or necessary to clarify the concentrated juice, as in the case of pineapple, the juice obtained by the concentration process is a brown colored, cloudy and slightly viscous liquid. Clarification will be found desirable or necessary with other juices as well.

In the clarification of pineapple juice I have found it preferable to add to the juice diatomaceous earth, and then to heat the juice. Diatomaceous earth, such as kieselguhr, silicious earth or filter cel, assists greatly the filtration of the concentrated juice. Soft particles are formed by the coagulation of the proteids upon heating pineapple juice, which particles clog the filters unless some filtration aid is added. Other clarification agents that might be used are kaolin, Spanish clay, casein, egg albumen, etc. In practice I have found it desirable to use between one and three per cent. of diatomaceous earth, although this proportion or percentage may be very widely varied.

To assist both in the clarification of the juice and to secure or effect rapid filtration, heating is desirable, and with many juices it is practically necessary. Pineapple juice, and other fruit juices as well, contain a considerable quantity of proteid and possibly other matter which is coagulated by heat. Heating at this stage of the process will remove this undesirable matter or matters, so that there is no subsequent precipitation thereof, or clouding of the juice, in subsequent sterilization by the action of heat. By heating the juice, fairly rapid filtration is effected, and in the case of pineapple juice a bright and clear golden liquid is obtained. The application of heat for a brief period and for the temperatures desired or required, does not effect the flavor of the juice, but leaves it unimpaired, and absolutely free from the very different and objectionable flavors imparted by boiling or protracted cooking. In practice it is preferable to heat the juice at this time to a somewhat higher temperature than that subsequently applied for the purpose of sterilization, as clouding and further precipitation of proteid during the sterilization process is thereby avoided.

I have found it advantageous and desirable to concentrate the original or natural juice of the pineapple to from two to three times its original strength, as previously indicated, which is from about twenty to thirty degrees Brix (which corresponds to the Balling hydrometer, which is in extensive use in the United States for syrup determination). The reading of twenty or thirty degrees Brix signifies a specific gravity of the liquid corresponding to twenty to thirty per cent. sugar content. It will be understood that other concentrations, or degrees of concentration, may be effected in the manner indicated.

The concentrated pineapple juice, when intended for use as a beverage by diluting the bottled juice, will be found by many to be too acid. It is advantageous and desirable to sweeten the juice during the process of manufacturing, as by this means a proper flavor is secured, and the added sugar assists in sterilizing and preserving the juice. In practice, I prefer to use refined cane sugar as the sweetening agent, although other sugars, such as corn syrup, could be used. The amount of sugar to be added will depend on the degree of concentration of the juice.

In the case of the twenty to thirty degree Brix juice already described, I have found it desirable to add about two to four pounds of sugar to a gallon of the juice. This mixture will produce a syrup of from forty to fifty-five degrees Brix. This syrup diluted with four parts of water makes a very delicious beverage, either with plain water, or with carbonated or other charged water.

I have discovered that it is very advantageous and desirable in making the pineapple or other fruit juice syrup to add the sugar to the concentrated juice prior to filtration. If added at this time, instead of after filtration, as is the customary practice in the art, a much better separation from the liquid of proteid, colloidal, and gummy matters is effected and the product is clearer and more brilliant and is also more stable and permanent.

The steps of adding the diatomaceous earth, adding the sugar, and the heating of the unclarified concentrated juice may take place in any sequence before filtration. I prefer for convenience, in practice to add the diatomaceous earth to the concentrated juice, heat the mixture, then add and dissolve the sugar, and heat the solution again.

As a practical step in commercial manufacture, the hot syrup may be settled prior to and as an aid to filtration, although this step may be dispensed with. After settling, the juice may be decanted or siphoned to the filters. In the process or step of filtration and referring to pineapple juice as an example, the commercial filters known as Karl Kiefer filters may be employed, with paper pulp pads, although other devices may be employed with equally satisfactory results and also with other juices as well. Also with certain juices and in certain cases, careful settling and decanting or siphoning may be substituted for the filtering, although in most cases filtering will be found most satisfactory.

I have found that the most desirable method of filtration is to omit the settling of the heated syrup, and after a short period of heating to pump the hot juice directly through an ordinary plate and frame filter press, or other filter press, adapted to the handling of press cakes. All parts of the press in contact with the syrup should be of such materials as are resistant to the action of the hot syrup and which will not contaminate the syrup. By this method of filtration, the syrup is subjected to heat for a much shorter period of time and the sludge or residue can be drained from the syrup. The drained sludge or residue is then washed of adherent or included juice, and the washings returned to the ice cans to go through the process again and be reconcentrated.

The filtrate, from the filter press, a golden colored slightly viscous syrup, if not as clear and bright as desired, may be refiltered. For the second filtration, if necessary, the commercial filters known as Karl Kiefer filters may be employed with paper pulp pads, although other apparatus or devices may be employed with equally satisfactory results and with other juices.

The syrup is then sterilized, the sterilization being preferably effected by subjecting the liquid to a sterilizing heat. In commercial practice, the sterilization will be effected in conjunction with the bottling or other packaging of the liquid. Referring to pineapple syrup, the syrup is preferably heated before it goes into the bottles to about 170 degrees Fahrenheit, to assist in the subsequent sterilization. The bottles also are preferably sterilized with steam or hot water previous to being filled. The bottles are filled with the hot liquid and are then sealed. To effect or to perfect the sterilization, the bottles are placed in a hot water bath for thirty minutes with the temperature of the water at about 175 degrees F., although the time and temperature may be varied considerably. As has already been stated, the clarifying temperature for the juice is preferably somewhat higher than the sterilizing temperature, so as to avoid clouding and precipitation of proteids during the sterilizing process. The sterilization may be effected, when found desirable or advisable, by heating the juice to sterilizing temperatures, sterilizing the bottles, preferably by hot water or steam, and running the hot juice into the bottles and sealing. The bottles, if desired, may be filled with cold syrup, sealed and then sterilized by heat.

For beverage purposes, it is desirable to retain the acid of the pineapple juice in the syrup. For use as a syrup in canned goods, it is desirable to neutralize the acid either in whole or in part by "liming." This can be done by treating the syrup with calcium oxid, calcium hydroxid or calcium carbonate, heating, and filtering off the citrate of lime as a by-product. Or if desired the lime compound could be added to the syrup prior to the first filtration and the calcium citrate filtered off with the sludge in the first filtration.

It will be understood that changes may be made, within the scope of the appended claims, from the present preferred form or manner of practising the invention herein described without departing from the principles of the invention and without sacrificing its chief advantages.

What I claim is:—

1. The process of making syrup from fruit juice and imparting stability and permanent clearness thereto which comprises concentrating the fruit juice by freezing a part of the water content and separating the concentrated fruit juice from said frozen water content, clarifying the concentrated juice by heating it while avoiding protracted heating or boiling of the juice to separate impurities therefrom, and mixing sugar with the juice prior to said heating to effect more complete separation of the impurities in the juice than are separable by said heat application to render the clearness of the juice more complete and permanent, and removing all the separated impurities.

2. The process of making syrup from raw fruit juice and imparting stability and permanent clearness thereto which comprises clarifying the concentrated juice by heating it while avoiding protracted heating or boiling of the juice to separate impurities therefrom, and mixing sugar with the juice prior to said heating to effect more complete separation of the impurities in the juice than are separable by said heat application to render the clearness of the juice more complete and permanent, and removing all the separated impurities.

3. As a step in the manufacture of fruit juice the mixing of sugar into the fruit juice as a clarifying agent prior to heating the juice for the purpose of clarification to effect a greater clarification of the juice than would be effected by the amount of clarifying heat applied thereto.

In testimony whereof, I have signed my name to this specification, in the presence of two subscribing witnesses.

MAXWELL O. JOHNSON.

Witnesses:
D. E. CARMICHAEL,
W. G. McGOWAN.